(12) United States Patent
Furuki et al.

(10) Patent No.: US 9,616,678 B2
(45) Date of Patent: Apr. 11, 2017

(54) MOTOR CONTROL DEVICE AND PRINTER DEVICE

(71) Applicant: MITSUBISHI ELECTRIC CORPORATION, Tokyo (JP)

(72) Inventors: Ichiro Furuki, Tokyo (JP); Yoshifumi Yamamoto, Tokyo (JP); Tatsuya Egawa, Tokyo (JP); Kosuke Oda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/103,922

(22) PCT Filed: Oct. 23, 2014

(86) PCT No.: PCT/JP2014/078172
§ 371 (c)(1),
(2) Date: Jun. 13, 2016

(87) PCT Pub. No.: WO2015/098261
PCT Pub. Date: Jul. 2, 2015

(65) Prior Publication Data
US 2016/0311229 A1    Oct. 27, 2016

(30) Foreign Application Priority Data

Dec. 27, 2013  (JP) ................................. 2013-271000

(51) Int. Cl.
B41J 29/393    (2006.01)
B41J 2/35      (2006.01)
(Continued)

(52) U.S. Cl.
CPC .... *B41J 2/35* (2013.01); *H02P 8/18* (2013.01); *B41J 3/4075* (2013.01)

(58) Field of Classification Search
CPC .. B41J 29/38; H02P 8/38; H02P 6/182; H02P 8/12; H02P 8/14
See application file for complete search history.

(56) References Cited

U.S. PATENT DOCUMENTS 6,049,182 A    4/2000 Nakatani et al.
6,515,446 B1   2/2003 Koide et al.
(Continued)

FOREIGN PATENT DOCUMENTS

JP    3-139197 A    6/1991
JP    3-256595 A   11/1991
(Continued)

*Primary Examiner* — Lamson Nguyen
(74) *Attorney, Agent, or Firm* — Birch, Stewart, Kolasch & Birch, LLP

(57) ABSTRACT

Speed fluctuations are decreased with a simple method even when a stepping motor (100) having comparatively large torque fluctuations is used. A drive pulse modulating unit (112) which modulates the frequency of a drive pulse to be inputted to the stepping motor (100) is provided. The drive pulse modulating unit (112) modulates the constant frequency of the drive pulse such that the frequency of the drive pulse within excitation-phase one cycle of the stepping motor (100) is: low for a period that is, by ⅛ cycle of the excitation-phase one cycle, before an excitation phase where the vibration of the stepping motor is the maximum; and high in an excitation phase that is by ½ cycle subsequent to the excitation phase where the drive pulse frequency is low.

8 Claims, 10 Drawing Sheets

(51) Int. Cl.
*H02P 8/18* (2006.01)
*B41J 3/407* (2006.01)

(56) References Cited

U.S. PATENT DOCUMENTS

| | | | | |
|---|---|---|---|---|
| 6,601,944 | B1* | 8/2003 | Kawazoe | B41J 19/202 |
| | | | | 347/37 |
| 7,190,384 | B2 | 3/2007 | Imai | |
| 7,841,683 | B2* | 11/2010 | Miyazawa | B41J 11/006 |
| | | | | 347/101 |
| 8,215,854 | B2* | 7/2012 | Kubota | B41J 35/28 |
| | | | | 347/214 |
| 8,511,792 | B2* | 8/2013 | Ito | B41J 2/155 |
| | | | | 347/30 |
| 2005/0168562 | A1 | 8/2005 | Imai | |

FOREIGN PATENT DOCUMENTS

| | | |
|---|---|---|
| JP | 6-315297 A | 11/1994 |
| JP | 10-191680 A | 7/1998 |
| JP | 11-254710 A | 9/1999 |
| JP | 2000-308384 A | 11/2000 |
| JP | 2002-369589 A | 12/2002 |
| JP | 2003-339192 A | 11/2003 |
| JP | 2004-135411 A | 4/2004 |
| JP | 2004-215461 A | 7/2004 |
| JP | 2005-219311 A | 8/2005 |
| JP | 2005-354800 A | 12/2005 |
| JP | 2006-256226 A | 9/2006 |
| JP | 2010-284942 A | 12/2010 |
| JP | 2011-207097 A | 10/2011 |

* cited by examiner

MOTOR CONTROL DEVICE AND PRINTER DEVICE

TECHNICAL FIELD

The present invention relates to a technique for suppressing print density unevenness in a printer device that uses a stepping motor as a recording paper convey driving source. In particular, the present invention relates to a motor control device and a printer device that can suppress density unevenness resulting from speed fluctuations within excitation-phase one cycle (electrical angle cycle) of a stepping motor.

BACKGROUND ART

Conventionally, stepping motors are widely used as the driving sources for sheet conveyance in printing devices. In a printing device that uses a stepping motor for sheet conveyance, speed fluctuations of the stepping motor serve as one factor of the print density unevenness.

In the stepping motor, an output torque inevitably varies between excitation phases. Due to these variations, the stepping motor involves inherent speed fluctuations corresponding to the frequency component of excitation-phase one cycle. Although the speed fluctuations are small, along with a recent increase in printing speed, the small speed fluctuations in sheet conveyance have come to appear noticeably as print unevenness.

FIG. 11 is a graph illustrating a print unevenness level corresponding to excitation-phase one cycle of the stepping motor.

Regarding FIG. 11, a sublimation type thermal transfer printer is used which employs, as a sheet convey driving source, a 2-phase stepping motor whose torque varies. This sublimation type thermal transfer printer prints an image by driving the stepping motor at a drive pulse frequency of 1440 Hz with a 1-2 phase excitation scheme where 8 steps constitute excitation-phase one cycle. The printing result is read by a scanner, and the read data in the sheet convey direction is Fourier-analyzed, thereby obtaining the graph in which the frequency is plotted along the axis of abscissa and the amplitude spectrum representing the print unevenness level is plotted along the axis of ordinate. As illustrated in FIG. 11, the peak level of the print unevenness appears at 180 Hz which indicates excitation-phase one cycle.

In order to decrease such print unevenness, for example, a motor individual whose output torque does not vary largely is chosen as a stepping motor to be used in a printing device, so that print unevenness resulting from variations in output torque of the stepping motor is suppressed as much as possible. To choose a motor individual, however, increases the cost.

In view of above, as a method of decreasing small speed fluctuations in sheet conveyance, a scheme is known according to which a damper or fly wheel is mounted on the motor shaft or load shaft so that rotation becomes smooth. Another method is also available (see Patent Literature 1). According to this method, a sine-wave current applied in the excitation phase is varied for each excitation-phase one cycle repeatedly to relate to the speed fluctuations being a frequency component in excitation-phase one cycle, among the speed fluctuation inherent to the stepping motor, thereby decreasing the speed fluctuations of the stepping motor.

CITATION LIST

Patent Literature

Patent Literature 1: JP 03-139197

SUMMARY OF INVENTION

Technical Problem

The method that uses a damper or fly wheel has a problem that it is disadvantageous in terms of device downsizing because, for example, it requires a mounting space, and that the device cost increases.

The method disclosed in Patent Literature 1 claims that it can decrease speed fluctuations by a simple electrical method. However, this literature discloses nothing concerning a means for specifically measuring and detecting the speed fluctuations being a frequency component within excitation-phase one cycle, nor a practical speed correcting method for each excitation phase.

The present invention has been made to solve the above problems, and has as its object to decrease the speed fluctuations with a simple method even in cases where a stepping motor having a relatively large torque variation is used in a thermal transfer printer device that uses a stepping motor as a sheet convey driving source.

Solution to Problem

A motor control device according to the present invention is a motor control device to control a stepping motor that performs driving by taking as input a drive pulse having a constant frequency. The motor control device includes:

a drive pulse modulating unit to modulate a frequency of a drive pulse to be inputted to the stepping motor, the drive pulse modulating unit modulating the frequency of the drive pulse having the constant frequency such that the frequency of the drive pulse within excitation-phase one cycle of the stepping motor is: lower than the constant frequency for a period that is, by ⅛ cycle of the excitation-phase one cycle, before an excitation phase where vibration of the stepping motor is the maximum; and higher than the constant frequency in an excitation phase that is by ½ cycle subsequent to the excitation phase where the drive pulse frequency is lower than the constant frequency.

Advantageous Effects of Invention

A motor control device according to the present invention modulates the frequency such that the frequency of the drive pulse within excitation-phase one cycle of the stepping motor is: lower than the constant frequency for a period that is, by ⅛ cycle of the excitation-phase one cycle, before an excitation phase where vibration of the stepping motor is the maximum; and higher than the constant frequency in an excitation phase that is by ½ cycle subsequent to the excitation phase where the drive pulse frequency is lower than the constant frequency. Therefore, even when a stepping motor having comparatively large torque fluctuations is used, the speed fluctuations can be decreased with a simple method.

DESCRIPTION OF EMBODIMENTS

The following embodiments will be described with referring to drawings. In the description of the following embodiments, directions such as, for example, "upper", "lower", "left", "right", "before", "behind", "front", and "rear" are mentioned as such for the sake of the descriptive convenience and do not limit the arrangements, orientations, and the like of devices, instruments, components, and the like.

Embodiment 1

Figure 1:
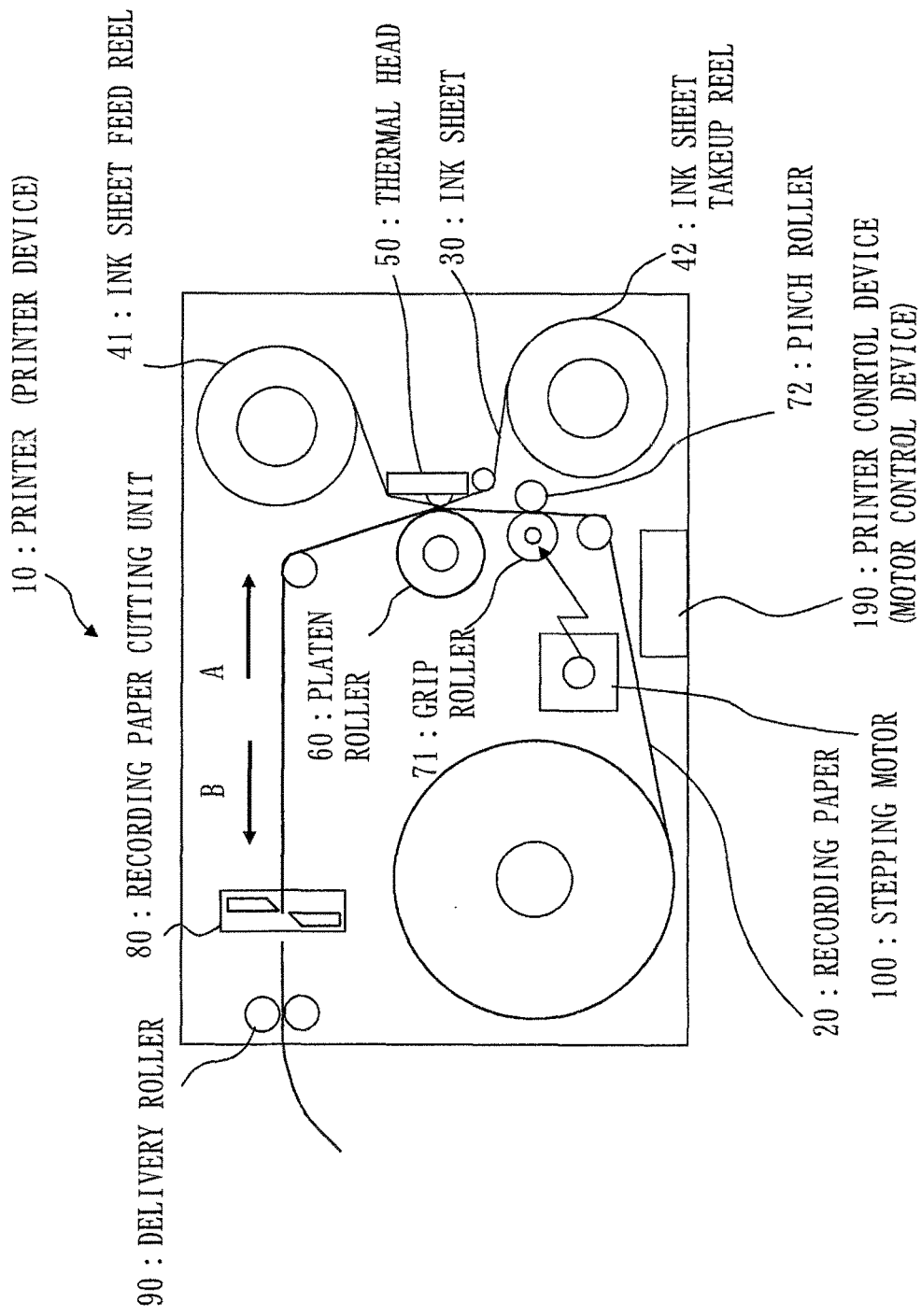
FIG. 1 is a mechanism configuration diagram of a printer according to Embodiment 1.

FIG. 1 is a mechanism configuration diagram of a printer 10 according to Embodiment 1.

Referring to FIG. 1, the printer 10 (printer device) is, for example, a thermal transfer printer device employing a sublimation type thermal transfer scheme.

As illustrated in FIG. 1, the printer 10 includes, as mechanism sections, an ink sheet 30, an ink sheet feed reel 41, an ink sheet takeup reel 42, a thermal head 50, a platen roller 60, a grip roller 71, a pinch roller 72, a recording paper cutting unit 80, a delivery roller 90, a stepping motor 100, and a printer control device 190. The printer 10 uses, as the recording sheet, recording paper 20 being roll paper.

The ink sheet 30 has color ink layers of yellow (Y), magenta (M), and cyan (C), and an overprint layer (OP). The ink sheet 30 is supplied by the ink sheet feed reel 41 and taken up by the ink sheet takeup reel 42.

The thermal head 50 and platen roller 60 are used for recording using the ink sheet 30. The thermal head 50 has a plurality of heat-generating elements in the main scanning direction, and can be pressed against and retreated from the platen roller 60 by a driving means (not shown).

The grip roller 71 and pinch roller 72 are used for conveyance of the recording paper 20. The grip roller 71 conveys the recording paper 20 at a constant speed. The pinch roller 72 is arranged to oppose the grip roller 71.

The stepping motor 100 is driven upon taking as input a drive pulse having a predetermined frequency, thereby driving the grip roller 71. The stepping motor 100 rotatively drives the grip roller 71 via a speed reduction mechanism (not illustrated).

The recording paper cutting unit 80 cuts off the recording paper 20 on which printing has been performed.

The delivery roller 90 discharges the cut-off recording paper 20 to the outside of the printer 10.

The printer control device 190 controls the mechanism sections of the printer 10. To control the printer 10 is to control, for example, a pre-print operation, a print operation, and the like (to be described later) of the printer 10.

Figure 2:
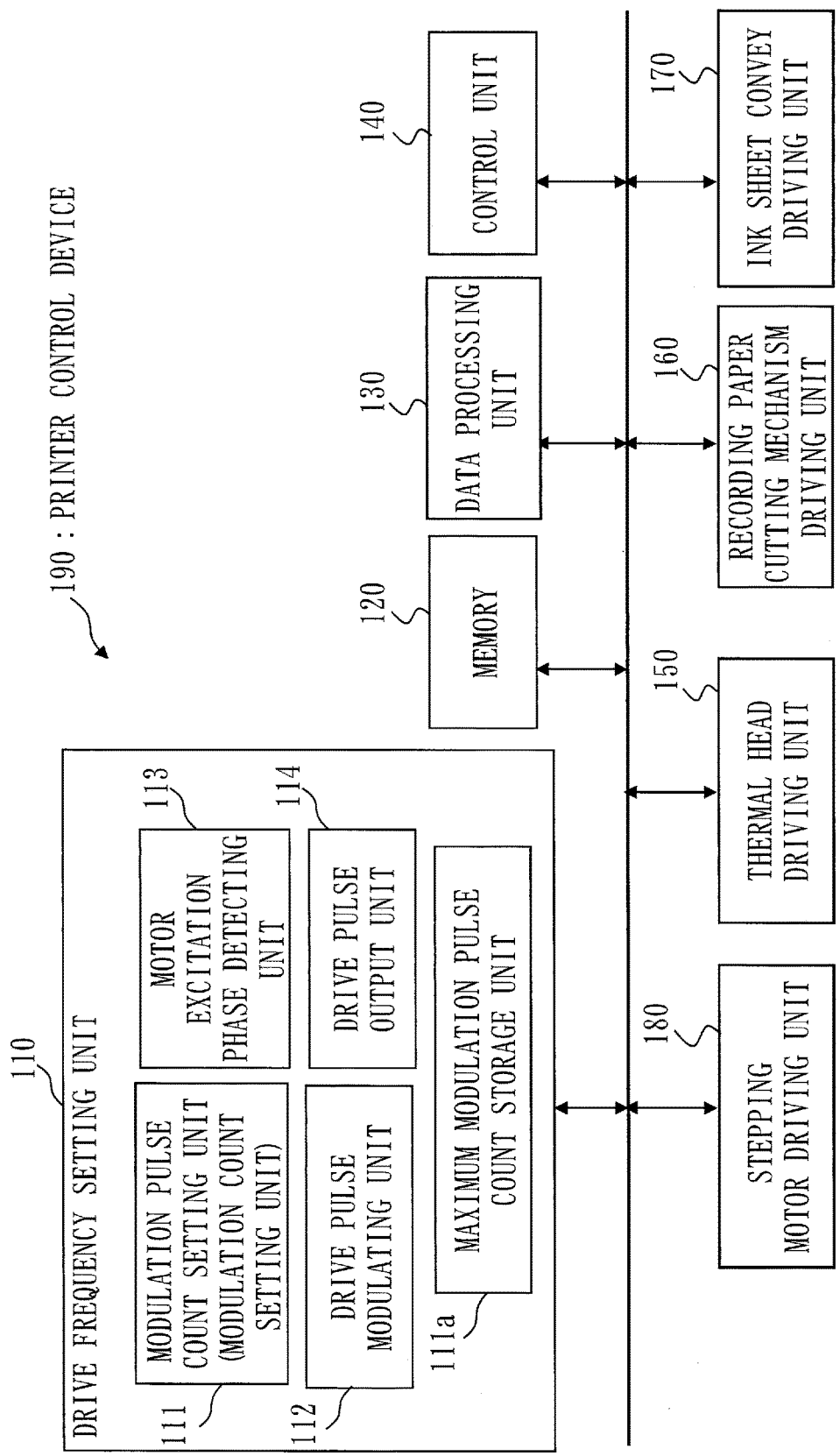
FIG. 2 is a diagram illustrating a block configuration of a printer control device according to Embodiment 1.

FIG. 2 is a diagram illustrating a block configuration of the printer control device 190 according to this embodiment.

The block configuration of the printer control device 190 will be described with reference to FIG. 2.

As illustrated in FIG. 2, the printer control device 190 includes a drive frequency setting unit 110, a memory 120, a data processing unit 130, a control unit 140, a thermal head driving unit 150, a recording paper cutting mechanism driving unit 160, an ink sheet convey driving unit 170, and a stepping motor driving unit 180.

The drive frequency setting unit 110 sets the drive pulse frequency of the stepping motor 100 and outputs the drive pulse having the drive pulse frequency that is set. The drive frequency setting unit 110 is an example of a motor control device of this embodiment.

The drive frequency setting unit 110 includes a modulation pulse count setting unit 111, a drive pulse modulating unit 112, a motor excitation phase detecting unit 113, a drive pulse output unit 114, and a maximum modulation pulse count storage unit 111a.

The modulation pulse count setting unit 111 sets a maximum modulation pulse count p of the drive pulse frequency of the stepping motor 100 and stores the maximum modulation pulse count p to the maximum modulation pulse count storage unit 111a. The maximum modulation pulse count p is used when calculating the maximum value and minimum value of the frequency of the drive pulse to be inputted to the stepping motor 100. The modulation pulse count setting unit 111 is an example of a modulation count setting unit.

The drive pulse modulating unit 112 modulates the frequency of the drive pulse of the stepping motor 100.

The motor excitation phase detecting unit 113 detects the excitation phase of the stepping motor 100.

The drive pulse output unit 114 outputs the drive pulse of the stepping motor 100.

The operations of the constituent portions of the printer control device 190 will be described later in detail.

Figure 3:
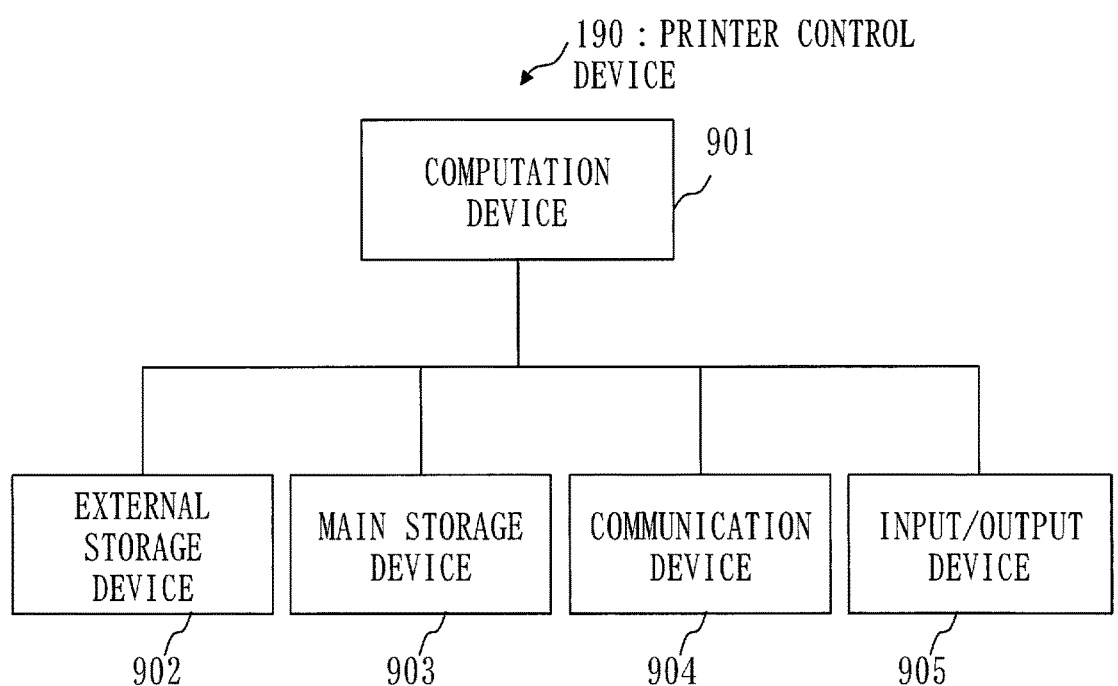
FIG. 3 is a diagram illustrating an example of a hardware configuration of the printer control device according to Embodiment 1.

FIG. 3 is a diagram illustrating an example of a hardware configuration of the printer control device 190 according to Embodiment 1.

The printer control device 190 includes a computer and can implement the elements of the printer control device 190 by programs.

Regarding the hardware configuration of the printer control device 190, a computation device 901, an external storage device 902, a main storage device 903, a communication device 904, and an input/output device 905 are connected to a bus.

The computation device 901 is a CPU (Central Processing Unit) which executes the programs.

The external storage device 902 is, for example, a ROM (Read Only Memory), a flash memory, or a hard disk device. The memory 120 is an example of the external storage device 902.

The main storage device 903 is a RAM (Random Access Memory).

The communication device 904 is, for example, a communication board, and is connected to a LAN (Local Area Network) or the like. The communication device 904 is not necessarily connected to a LAN but may be connected to a WAN (Wide Area Network) such as an IP-VPN (Internet Protocol Virtual Private Network), a wide-area LAN, or an ATM (Asynchronous Transfer Mode) network; or the Internet. The LAN, the WAN, and the Internet are examples of the network.

The input/output device 905 is, for example, a keyboard or a display device. Alternatively, a touch panel, a touch pad, a track ball, a pen tablet, or another pointing device may be used as the input/output device 905. The display device may be an LCD (Liquid Crystal Display), a CRT (Cathode Ray Tube), or another displaying device.

The programs are usually stored in the external storage device 902. The programs are loaded in the main storage device 903 and are sequentially read by the computation device 901 and executed.

The programs are those that implement the functions each described as "unit" illustrated in FIG. 2.

Furthermore, an operating system (OS) is also stored in the external storage device 902. At least part of the OS is loaded to the main storage device 903. The computation device 902, while executing the OS, executes the programs that implement the functions of each "unit" illustrated in FIG. 1.

Application programs are also stored in the external storage device 902. The application programs are loaded in the main storage device 903 and are sequentially executed by the computation device 901.

The outline of the print operation of the printer 10 performed by the control of the printer control device 190 will be described with referring to FIGS. 1 and 2.

In a pre-print state, the ink sheet 30 is arranged to pass between the thermal head 50 and the platen roller 60. The recording paper 20 passes between the ink sheet 30 and the platen roller 60 and is sandwiched by the grip roller 71 and the pinch roller 72.

When the control unit 140 outputs a print operation start signal, the grip roller 71 is driven, and a pre-print operation stage (process) is performed where print positioning of the recording paper 20 and the like are performed by a position detection means (not shown).

Subsequently, the thermal head 50 is pressed against the platen roller 60 by a driving means (not shown) so that the the ink sheet 30 and the recording paper 20 come into tight contact with each other. Then, the stepping motor 100 is driven via the stepping motor driving unit 180 in accordance with a drive pulse signal outputted from the drive frequency setting unit 110.

Input image data is stored in the memory 120 and converted into printing data by the data processing unit 130.

Subsequently, the control unit 140 performs the print operation by controlling the thermal head driving unit 150, stepping motor driving unit 180, recording paper cutting mechanism driving unit 160, and ink sheet convey driving unit 170.

When the print operation is started, the grip roller 71 starts conveying the recording paper 20 in a print direction (A direction in FIG. 1). Simultaneously, the thermal head 50 starts printing Y color on the recording paper 20. At this time, the thermal head driving unit 150 drives the thermal head 50 based on the print data outputted from the data processing unit 130, and the thermal head 50 prints ink of the ink sheet 30 onto the recording paper 20 line by line. The ink sheet takeup reel 42 takes up the ink sheet 30 which has served for printing.

After Y-color print is done, the thermal head 50 is retreated by the driving means (not shown), and the grip roller 71 conveys the recording paper 20 to a print start position in the delivery direction (B direction in FIG. 1). This action is called swing-back (SB). Using a detection means (not shown), the ink sheet takeup reel 42 detects an M-color leading position on the ink sheet 30 that has completed Y-color print. The ink sheet takeup reel 42 takes up the ink sheet 30 until the M-color leading position coincides with an M-color leading position being a print start position.

After that, the thermal head 50 is pressed against the platen roller 60, the grip roller 71 starts conveying the recording paper 20 in the print direction (A direction in FIG. 1), and the thermal head 50 starts M-color print, in the same manner as in Y-color print. After M-color print is ended, the same operation as that performed after Y-color print is ended is performed. The grip roller 71 conveys the recording paper 20 until the print start position. The thermal head 50 prints C color and transfers the OP by the same print operation as that conducted in Y-color print and M-color print.

After Y-, M-, and C-color print and OP transfer are ended, the thermal head 50 is retreated by the driving means (not illustrated), and the grip roller 71 conveys the recording paper 20 in the delivery direction (B direction in FIG. 1). When the print leading position of the recording paper 20 reaches the recording paper cutting unit 80 along a convey path, the grip roller 71 stops driving, the recording paper cutting unit 80 cuts the recording paper 20 in the main scanning direction, and the delivery roller 90 discharges the cut-off recording paper 20 to the outside of the printer 10.

Figure 4:
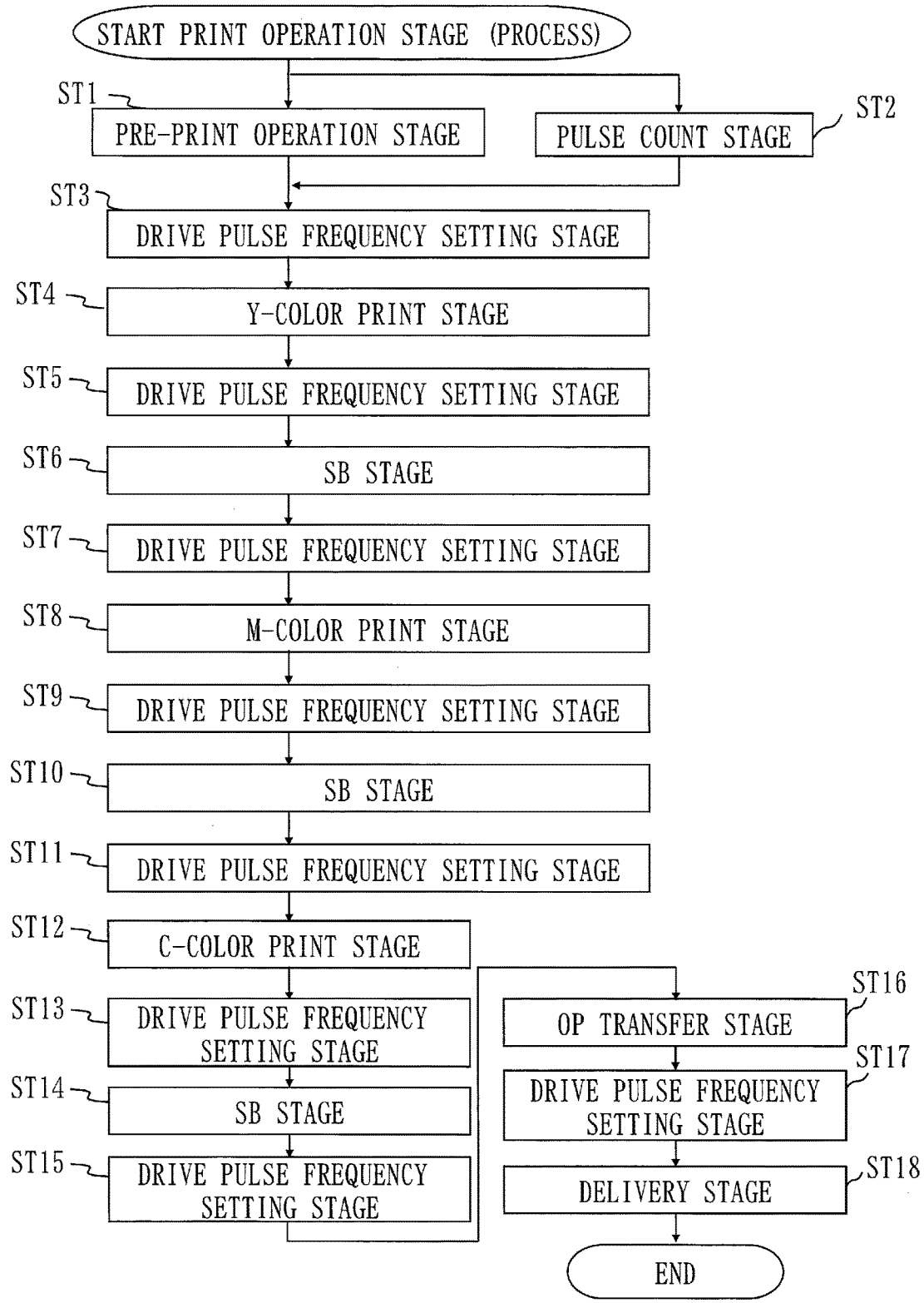
FIG. 4 is a flowchart illustrating the procedure of a print operation stage (printing operation process) of the printer performed by control of the printer control device according to Embodiment 1.

FIG. 4 is a flowchart illustrating a print operation stage (process) of the printer 10 performed by control of the printer control device 190 according to this embodiment.

The print operation stage (process) of the printer 10 performed by the control of the printer control device 190 will be described with reference to FIG. 4.

When the print operation stage is started, in step ST1, the drive frequency setting unit 110 outputs a drive pulse signal to the stepping motor driving unit 180. The stepping motor driving unit 180 excites the stepping motor 100, and the pre-print operation stage described above is executed in the printer 10. Note that the first excitation phase of the stepping motor 100 in step ST1 is set to be always the same among print operations.

In step ST2, simultaneously with the pre-print operation stage of step ST1, the motor excitation phase detecting unit 113 starts counting the pulses outputted from the drive frequency setting unit 110. This pulse counting by the motor excitation phase detecting unit 113 is continued until the entire print operation stage is complete.

The stepping motor 100 in the pre-print operation stage of step ST1 is driven at a predetermined frequency sent from the control unit 140, for the predetermined pulse count sent from the control unit 140.

In step ST3, the drive frequency setting unit 110 executes a drive pulse frequency setting stage (process) after the pre-print operation stage of step ST1 is complete. The drive frequency setting unit 110 executes a modulation operation of the drive pulse frequency in the drive pulse frequency setting stage.

Figure 5:
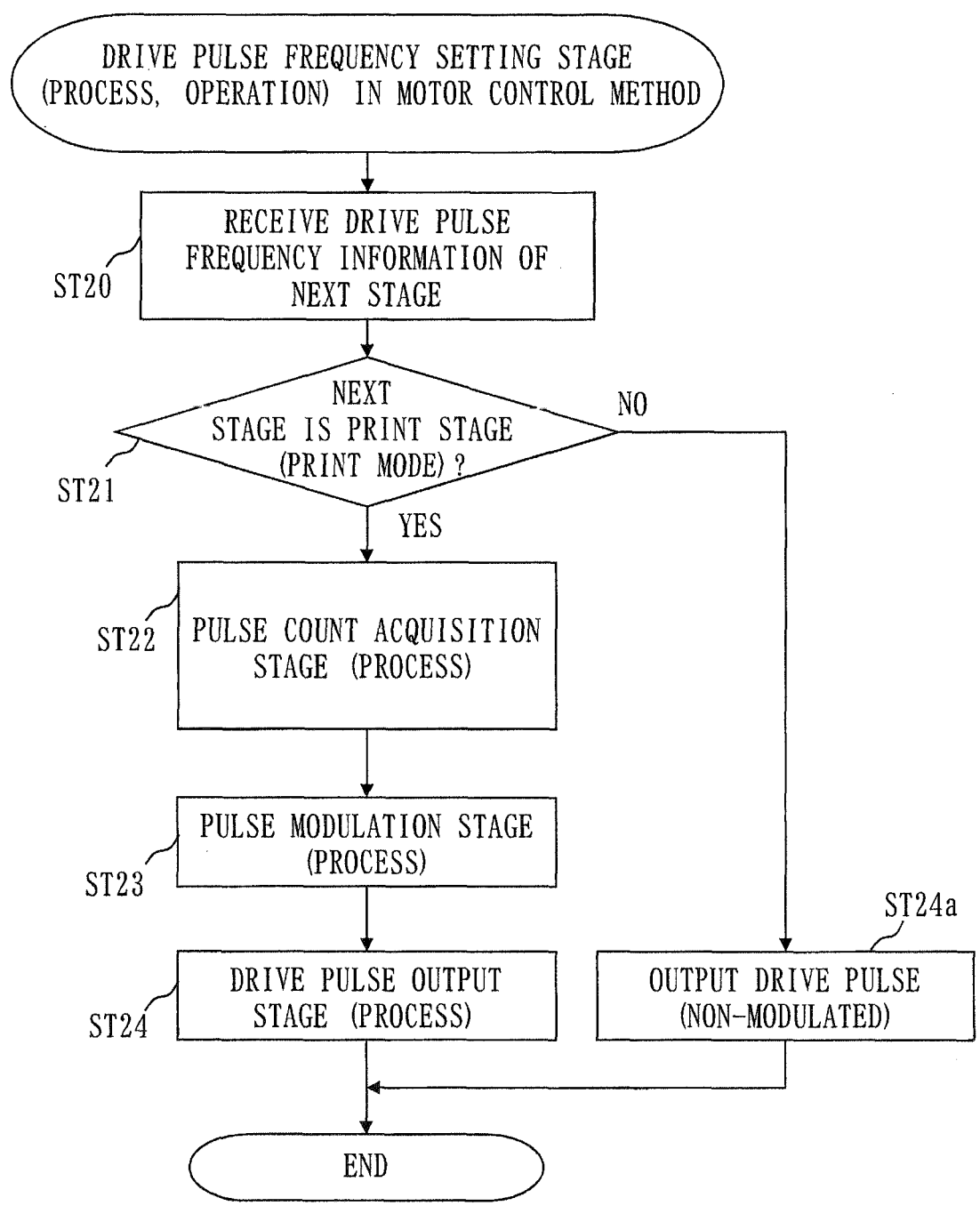
FIG. 5 is a flowchart illustrating the procedure of a drive pulse frequency setting stage (process, operation) performed by a drive frequency setting unit in the print operation stage according to Embodiment 1.

FIG. 5 is a flowchart illustrating the drive pulse frequency setting stage (process, operation) performed by the drive frequency setting unit 110 in the print operation stage according to this embodiment.

The drive pulse frequency setting stage (process) and a pulse modulation stage (process) (ST23) in a motor control method for the printer control device 190 will be described with reference to FIG. 5.

In step ST20, the drive frequency setting unit 110 receives drive pulse frequency information of the next stage which is sent from the control unit 140.

In step ST21, the drive frequency setting unit 110 determines by a processing device whether or not the next stage is of a print mode or not.

If the next stage is of the print mode (Yes in step ST21), the process advances to step ST22.

If the next stage is not of the print mode (No in step ST21), the process advances to step ST24a.

In step ST24a, the drive frequency setting unit 110 outputs drive pulses (non-modulated drive pulses) indicated by the drive pulse frequency information of the next stage sent from the control unit 140, by a pulse count designated by the control unit 140 in advance. Then, the process is ended.

In step ST22, the motor excitation phase detecting unit 113 executes a pulse count acquisition stage. In the pulse count acquisition stage, the motor excitation phase detecting unit 113 acquires the count of pulses of after the pre-print operation stage (step ST1) is ended which are counted in the pulse count stage (step ST2). Based on the acquired pulse count, the motor excitation phase detecting unit 113 detects the next excitation phase of the stepping motor 100.

In step ST23, the drive pulse modulating unit 112 executes the pulse modulation stage. In the pulse modulation stage, the drive pulse modulating unit 112 executes modulation of the pulse frequency to match the excitation phase detected by the motor excitation phase detecting unit 113.

In step ST24, the drive pulse output unit 114 outputs drive pulses modulated by the drive pulse modulating unit 112, by a pulse count designated by the control unit 140 in advance (drive pulse output stage).

The pulse modulation stage (process, operation) (step ST23) performed by the drive frequency setting unit 110 will be described with reference to FIGS. 6 and 7.

Figure 6:
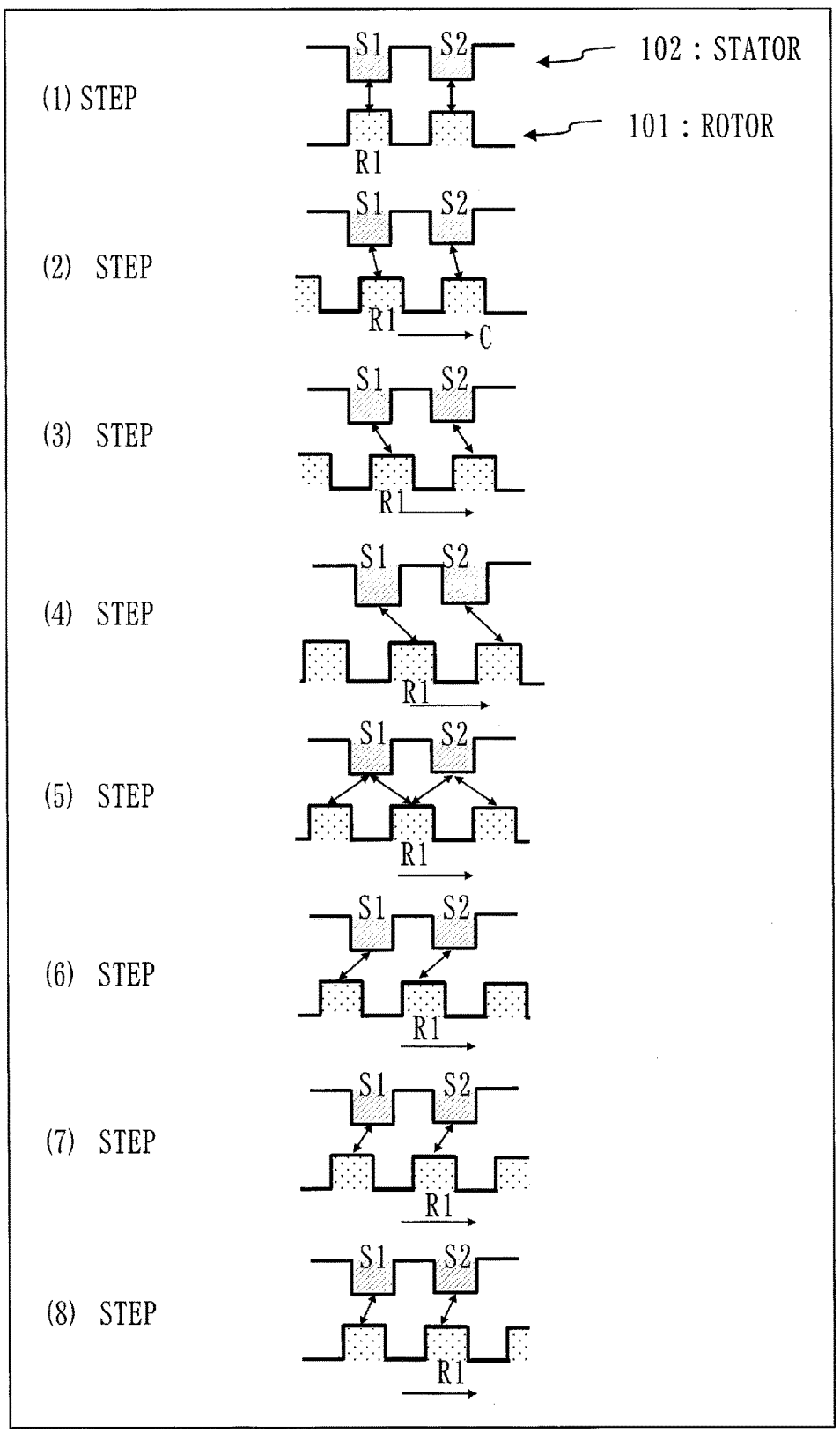
FIG. 6 is a schematic diagram explaining the positional relation between a stator and rotor of a stepping motor according to Embodiment 1.

FIG. 6 is a schematic diagram explaining the positional relation between a stator 102 and a rotor 101 of the stepping motor 100 according to this embodiment.

First, the excitation phase of the stepping motor 100 and the positional relation between the stator 102 and rotor 101 of the stepping motor 100 will be described with reference to FIG. 6.

FIG. 6 is a diagram illustrating the schematic positional relationship between the small teeth of the stator 102 and the small teeth of the rotor 101 of a case where the 2-phase stepping motor 100 is 1-2 phase excited. As illustrated in FIG. 6, the stepping motor 100 performs driving such that 8 steps of (1st step) of (1) through (8th step) of (8) constitute excitation-phase one cycle.

Referring to FIG. 6, the arrows between the stator 102 and rotor 101 represent forces attracting each other. The movement of a small tooth R1 of the rotor 101 by one tooth (corresponding to a distance from a small tooth S1 to S2 of the stator 102) constitutes excitation-phase one cycle. The rotor 101 moves for one tooth with 8 steps of (1) to (8).

The small teeth of the rotor 101 and the small teeth of the stator 102 oppose each other and remain stationary where they attract each other ((1) of FIG. 6). In (1) of FIG. 6, the small tooth R1 of the rotor 101 and the small tooth S1 of the stator 102 oppose each other.

In this state, when an external force is applied to the stepping motor shaft in the direction of an arrow C, a torque is generated in a direction to reverse to the position of (1), and the rotor 101 comes to a standstill at the position where the torque and the external force balance ((2) of FIG. 6).

As the external force is further applied, the rotor 101, passing through an unstable position ((5) of FIG. 6), moves to a position ((8) of FIG. 6) where the small teeth of the rotor 101 and the small teeth of the stator 102 oppose next. Immediately after (8) of FIG. 6 (corresponding to (1) of FIG. 6), the small tooth R1 of the rotor 101 and a small tooth S2 of the stator 102 oppose each other.

When the rotor 101 is rotatively driven, since the forces of the stator 102 and rotor 101 to attract each other are strong at the position of (1) of FIG. 6, the rotating speed of the rotor 101 is slightly low.

At the position of (5) of FIG. 6, the stator 102 and the rotor 101 are displaced from each other by half pitch, and the small tooth R1 of the rotor 101 is in an unstable state where the small tooth R1 and both the small teeth S1 and S2 of the stator 102 attract each other. The rotor 101 will hence rotate easily in the direction of any larger external force.

Therefore, when the rotor 101 is rotatively driven, the external force acts in the rotating direction C of the rotor 101, so that the rotating speed of the rotor 101 is slightly higher at the position of (5) of FIG. 6.

As described above, small speed fluctuations occur in excitation-phase one cycle, which cause print unevenness. Usually, the drive pulse frequency of the stepping motor 100 is constant during the print operation. To decrease the speed fluctuations, the drive pulse frequency to be supplied to the stepping motor 100 may be increased where the rotating speed of the rotor 101 decreases, and be decreased where the rotating speed of the rotor 101 increases. It is, however, difficult to specify an excitation phase where the small speed fluctuations occur. In view of this, the present inventors conducted studies for specifying the excitation phase where the speed fluctuations occur, and found a strong correlation between the excitation phase where the speed fluctuations occur and the vibration of the stepping motor.

More specifically, it is found that the print unevenness is suppressed if a constant drive pulse frequency is modulated such that the drive pulse frequency is low (for example, lower than a constant frequency) for a period that is, by ⅛ cycle of excitation-phase one cycle, before an excitation phase where the vibration of the stepping motor is the maximum, and such that the drive pulse frequency is high (for example, higher than the constant frequency) for an excitation phase that is by ½ cycle subsequent to the excitation phase where the drive pulse frequency is low.

Figure 7:
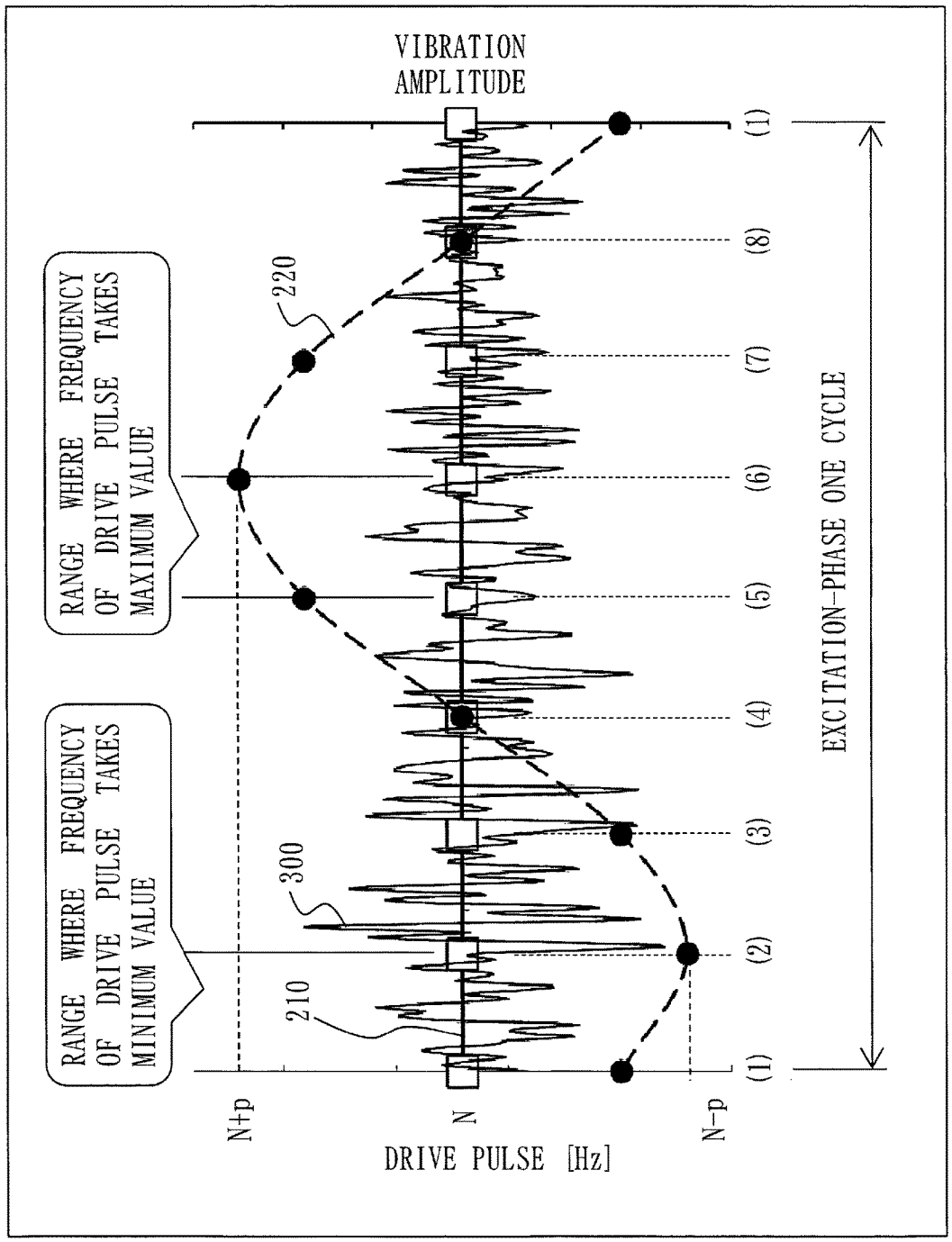
FIG. 7 is a graph illustrating a drive pulse frequency within excitation-phase one cycle of the stepping motor in the printer according to Embodiment 1.

FIG. 7 is a graph illustrating a change in frequency of the drive pulse within excitation-phase one cycle of the stepping motor 100 according to this embodiment.

FIG. 7 illustrates a vibration waveform 300 for excitation-phase one cycle of the stepping motor 100 in pre-modulation constant frequency drive, and a pre-modulation drive pulse frequency and a post-modulation drive pulse frequency within excitation-phase one cycle. The post-modulation drive pulse frequency has been modulated based on the vibration waveform 300. In FIG. 7, (1) to (8) represent excitation phases. The vibration waveform 300 of the stepping motor 100 is measured in advance using a detector such as an accelerator pickup.

Referring to FIG. 7, assume that the pre-modulation constant frequency is defined as N and that the maximum value of the post-modulation drive pulse frequency that has been obtained when the constant frequency N is modulated, is defined as the maximum modulation pulse count p. The maximum modulation pulse count p is stored in the maximum modulation pulse count storage unit 111a in advance by the modulation pulse count setting unit 111. Alternatively, an optimum maximum modulation pulse count may be calculated by the modulation pulse count setting unit 111 and may be stored in the maximum modulation pulse count storage unit 111a.

Note that a pre-modulation drive pulse frequency 210 is constant at N Hz (hertz) (an example of the constant frequency).

A post-modulation drive pulse frequency 220 is obtained by modulating the original drive pulse frequency (N) such that a change in frequency of the drive pulse forms a sine wave within excitation-phase one cycle in which the drive pulse frequency is (N−p) Hz at an excitation timing of the excitation phase (2) where the vibration waveform 300 is the maximum and the drive pulse frequency is (N+p) Hz at an excitation timing of the excitation phase (6) that is by ½ cycle subsequent to the excitation phase (2).

When modulation is carried out as indicated by the post-modulation drive pulse frequency 220 illustrated in FIG. 7, the speed fluctuations within excitation-phase one cycle appear as N Hz.

In ST22, the motor excitation phase detecting unit 113 detects the position the excitation phase corresponds to among (1) to (8) of FIG. 7, based on the obtained pulse count.

The drive pulse modulating unit 112 modulates the drive pulse to match the position detected by the motor excitation phase detecting unit 113.

In ST23, the drive pulse modulating unit 112 modulates the constant frequency N Hz such that the frequency of the drive pulse within excitation-phase one cycle of the stepping motor 100 takes: the minimum value in the excitation phase (2) where the vibration waveform 300 of the stepping motor 100 is the maximum; and the maximum value in the phase (6) that is by ½ cycle delayed from the excitation phase (2) where the frequency takes the minimum value, as illustrated in FIG. 7. The excitation phase for which the drive pulse frequency is modulated to take the minimum value may be located in the excitation phase that is by ⅛ cycle before the excitation phase where the vibration waveform 300 is the maximum.

For example, the drive pulse modulating unit 112 may modulate the constant frequency N Hz such that the frequency of the drive pulse within excitation-phase one cycle of the stepping motor 100 takes: the minimum value within a range between the excitation phase (2) and the excitation phase (1) that is by ⅛ cycle before the excitation phase (2); and the maximum value in a phase that is delayed from the phase where the frequency takes the minimum value, by ½ cycle of excitation-phase one cycle.

Also, the drive pulse modulating unit 112 performs modulation such that the average value of the maximum value (N+p) and the minimum value (N−p) of the post-modulation pulse frequency (modulation pulse frequency) is the same as the pre-modulation frequency (N) and such that the change in frequency of the drive pulse forms a sine wave within excitation-phase one cycle of the stepping motor 100.

In the drive pulse output stage (step ST24), the drive pulse modulated in the above manner is outputted from the drive pulse output unit 114 by the pulse count designated in advance by the control unit 140.

Back to FIG. 4, description will be resumed on the print operation stage of the printer 10 performed by the control of the printer control device 190.

In step ST4 (Y-color print stage), the printer 10 prints Y-color on the recording paper 20.

After step ST4 (Y-color print stage) is ended, the drive pulse frequency setting stage (see FIG. 5) is executed again in step ST5.

Back to FIG. 5, the outline of the operation of the drive pulse frequency setting stage in step ST5 will be described.

In step ST20 of FIG. 5, a drive pulse count and drive pulse frequency information that are necessary for the swing-back (SB) operation (step ST6 of FIG. 4) of rewinding the recording paper 20 are set in the drive frequency setting unit 110 by the control unit 140.

It is checked whether or not the next stage is of the print mode (step ST21 in FIG. 5). Since the next stage is not of the print mode, pulse modulation is not performed. The drive pulse is outputted to the stepping motor driving unit 180 at the drive pulse frequency and by the drive pulse count sent from the control unit 140 (step ST24a).

Back to FIG. 4, description on steps ST6 through ST18 will be resumed.

In step ST6, the swing-back stage (operation) is carried out. After the swing-back stage (step ST6) is ended, the drive pulse frequency setting stage (drive pulse modulation) for M-color print is executed in ST7. The drive pulse frequency setting stage is the same as the drive pulse frequency setting stage of step ST3. The outline of the operation of the drive pulse frequency setting stage of step ST7 will be briefly explained. The excitation phase is detected from the pulse count of before M-color print. The original drive pulse is modulated in excitation-phase one cycle to form a sine wave so that the drive pulse frequency is (N−p) Hz in the excitation phase (2) of FIG. 7 and that the drive pulse frequency is (N+p) Hz at the excitation timing of the excitation phase (6) that is by ½ cycle subsequent to the excitation phase (2).

The operations since the end of M-color print (step ST8) until the end of C-color print, that is, the operations from step ST9 through step ST12, are the same as the operations from step ST5 through step ST8, and their descriptions will accordingly be omitted. The operations of steps ST13 and ST14 are the same as the operations of steps ST5 and ST6, and their descriptions will accordingly be omitted.

In the drive pulse frequency setting stage of step ST15 and step ST17, drive pulse frequency modulation is not performed. A drive pulse frequency and a drive pulse count which are determined for the next stage (OP transfer stage, delivery stage) and sent by the control unit 140 are sent to the stepping motor driving unit 180, and the stepping motor 100 is driven.

In ST17, the printer 10 performs transfer of the OP.

In ST18, the printer 10 delivers the recording paper 20 on which printing has been done.

The description on the print operation stage (process) of the printer 10 by the control of the printer control device 190 is now completed.

As described above, the drive pulse modulating unit 112 of the printer control device 190 executes the drive pulse modulation stage only in the print operation stage.

The drive pulse frequency is not modulated except in an operation of the print mode (print operation stage) being the mode for image formation, because some speed fluctuations will not adversely affect the print image except in the operation of the print mode. In order to shorten the time required for the entire print operation stage (step ST1 to step ST18), in the operation of other than the print mode, the stepping motor 100 need be driven at a higher speed (high-frequency drive) than in the print mode. If the drive pulse frequency is modulated under a condition of the high-frequency driving, an operation malfunction such as stepping out of the stepping motor 100 may occur. Hence, it is preferable not to modulate the drive pulse frequency except in an operation of the print mode.

It does not matter if the drive pulse frequency is modulated in an operation of other than the print mode.

In this embodiment, the drive pulse frequency is modulated to form a sine wave such that the drive pulse frequency is the minimum in the excitation phase ((2) of FIG. 7) where the vibration waveform 300 within excitation-phase one cycle of the stepping motor 100 is the maximum. At this time, the excitation phase where the post-modulation drive pulse frequency is the maximum is at a position ((6) of FIG. 7) that is by ½ cycle delayed from the excitation phase ((2) of FIG. 7) where the drive pulse frequency is the minimum.

Alternatively, the excitation phase where the drive pulse frequency is the minimum may be at the position ((1) of FIG. 7) that is by ⅛ cycle before the excitation phase ((2) of FIG. 7) where the vibration waveform 300 within excitation-phase one cycle of the stepping motor 100 is the minimum. In this case, the excitation phase where the post-modulation drive pulse frequency is the maximum is at a position ((5) of FIG. 7) that is by ½ cycle delayed from the excitation phase ((1) of FIG. 7) where the drive pulse frequency is the minimum.

Figure 8:
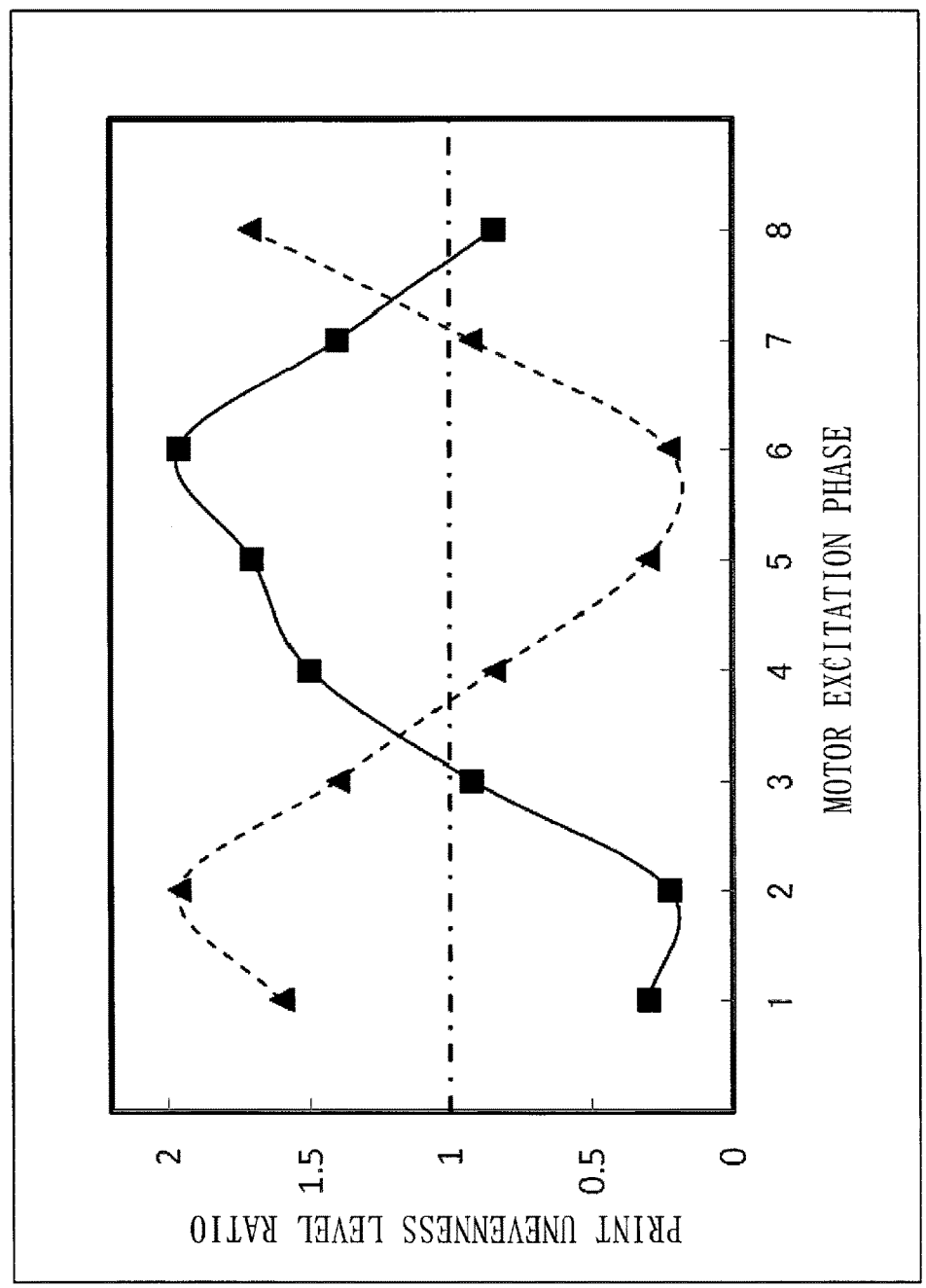
FIG. 8 is a graph illustrating the relation between a print unevenness level ratio and a motor excitation phase position where a modulated drive pulse frequency becomes the maximum according to Embodiment 1.

FIG. 8 is a graph illustrating the relation between a print unevenness level ratio and a motor excitation phase position where the modulated drive pulse frequency is the minimum according to this embodiment. FIG. 8 illustrates the result of an experiment conducted for obtaining the relation between the excitation phase where the modulated drive pulse frequency is the minimum/maximum and a corresponding print unevenness level.

In the graph of FIG. 8, the axis of abscissa of the graph represents the excitation phase of the motor and the figures along the axis correspond to (1) to (8) of FIG. 7.

The axis of ordinate of the graph represents the print unevenness level ratio in which level ratio 1 indicates the print unevenness level of before the drive frequency is modulated.

In FIG. 8, a solid line 230 represents the excitation phase position where the drive pulse frequency is the minimum, and a broken line 240 represents the excitation phase position where the drive pulse frequency is the maximum.

As illustrated in FIG. 8, the print unevenness level ratio is small at the excitation phase positions of (1) and (2) where the drive pulse frequency is the minimum.

This suggests that if the frequency of the drive pulse in excitation-phase one cycle of the stepping motor is modulated to take the minimum value within a range between the excitation phase where the vibration of the stepping motor within excitation-phase one cycle is the maximum, and an excitation phase that is by ⅛ cycle before the excitation phase where the vibration of the stepping motor is the maximum, then the print unevenness level can be effectively decreased.

In other words, desirably, the drive pulse modulating unit 112 may store the excitation phase where the vibration obtained from the relation between a vibration measurement value and the excitation phase in excitation-phase one cycle of the stepping motor 100, and may modulate the constant frequency such that the drive pulse within excitation-phase one cycle takes the minimum value within the range between the excitation phase where the vibration is the maximum and the excitation phase that is by ⅛ cycle before that excitation phase, and such that the drive pulse within excitation-phase one cycle takes the maximum value in the excitation phase that is by ½ cycle subsequent to the excitation phase where the drive pulse takes the minimum value.

In this embodiment, a stepping motor in which excitation-phase one cycle is constituted of 8 steps has been described. This embodiment may similarly be applied to a stepping motor in which excitation-phase one cycle is constituted of, for example, 16 steps or 32 steps.

Also, in this embodiment, a method of counting output pulses is employed as a method of detecting the motor excitation phase. However, the excitation phase may be detected by measuring the current of each phase of the motor.

As described above, with the printer 10 according to this embodiment, small speed fluctuations within excitation-phase one cycle of the stepping motor 100, being a paper convey driving source, can be decreased by modulating the drive pulse frequency within excitation-phase one cycle by the drive frequency setting unit 110 in accordance with the excitation phase of the stepping motor 100. By decreasing the speed fluctuations in this manner, print unevenness corresponding to the frequency of excitation-phase one cycle of the stepping motor 100 can be decreased with a simple method.

Embodiment 2

In this embodiment, matters that are different from Embodiment 1 will mainly be described.

In this embodiment, constituent portions having the same functions as the constituent portions described in Embodiment 1 will be denoted by the same reference numerals as in Embodiment 1, and their description will be omitted.

In Embodiment 1, the maximum modulation pulse count p is set by the modulation pulse count setting unit 111 in advance.

The speed fluctuations within excitation-phase one cycle of the stepping motor 100 vary depending on the motor individuals. Therefore, it is preferable to set the maximum modulation pulse count p separately for the individual stepping motor 100.

Hence, in a printer 10 according to this embodiment, first, an optimum maximum modulation pulse count p will be set for individual stepping motor 100 by a maximum modulation pulse count setting scheme, and after that a print operation stage will be executed. The print operation stage and a drive pulse frequency setting stage are the same as those described in Embodiment 1, and accordingly their descriptions will be sometimes omitted.

In this embodiment, the maximum modulation pulse count setting scheme for obtaining a more suitable maximum modulation pulse count p will be described.

Assume that a modulation pulse count setting unit 111 will execute the maximum modulation pulse count setting scheme. It does matter if another constituent portion executes the maximum modulation pulse count setting scheme.

Figure 9:
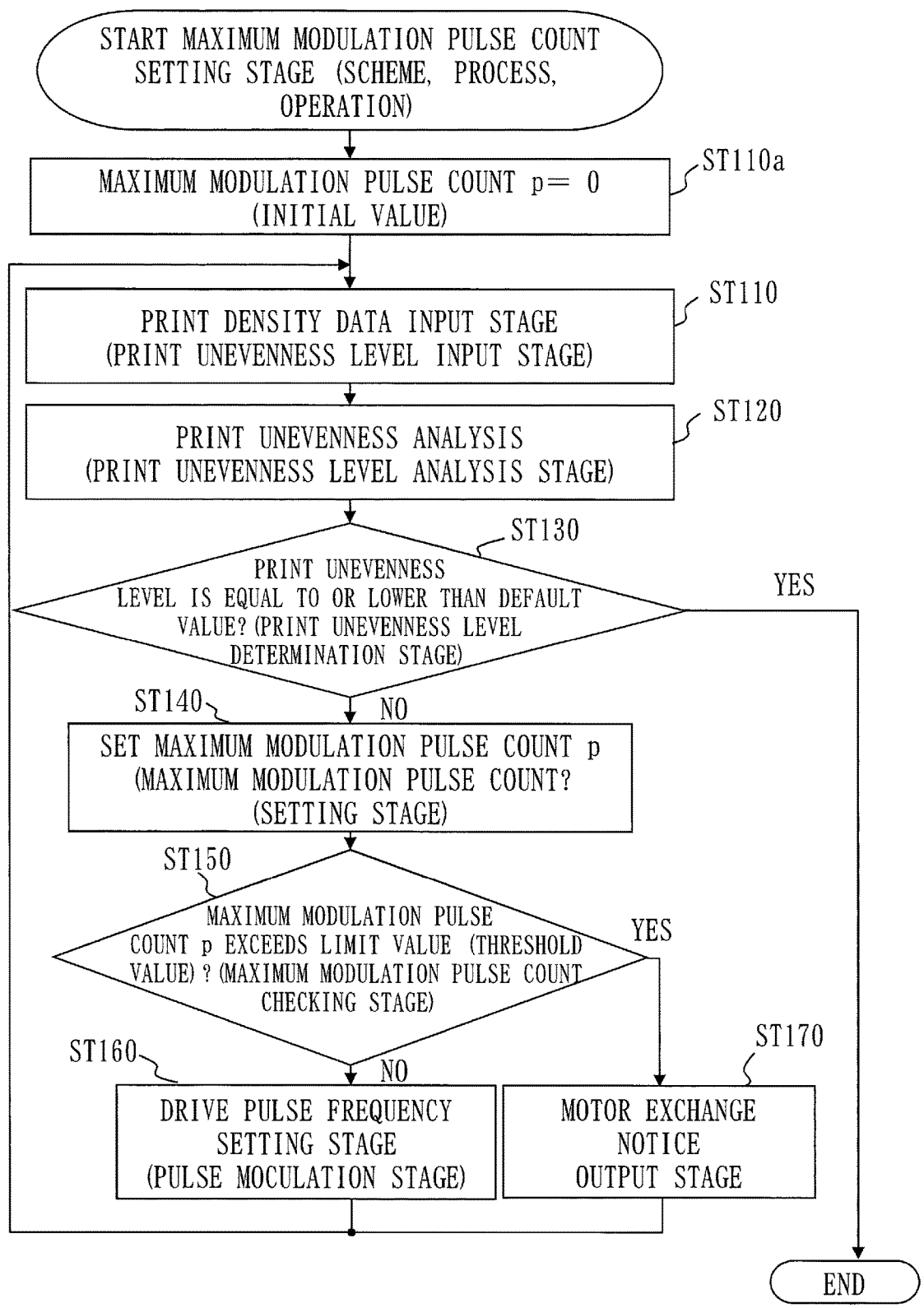
FIG. 9 is a flowchart illustrating a maximum modulation pulse count setting stage (scheme, process, operation) performed by a modulation pulse count setting unit according to Embodiment 2.

FIG. 9 is a flowchart illustrating the maximum modulation pulse count setting stage (scheme, process, operation)

performed by the modulation pulse count setting unit 111 according to this embodiment.

In the maximum modulation pulse count setting stage, the maximum modulation pulse count is defined as p, and the pre-modulation drive pulse frequency which is set in a drive frequency setting unit 110 is defined as N, in the same manner as in Embodiment 1.

When the maximum modulation pulse count setting stage is started, in step ST110*a*, the modulation pulse count setting unit 111 sets 0 as the initial value of the maximum modulation pulse count p.

In step ST110, a print density data input stage is executed.

First, the stepping motor 100 is mounted in the printer 10 by the user and a test print pattern is printed at a setting drive pulse frequency N Hz. The test print pattern is preferably a halftone solid pattern or the like whose print unevenness is easy to detect. The test print pattern is read by the user using a scanner. The modulation pulse count setting unit 111 takes as input the density data (luminance data) read by the scanner.

Figure 11:
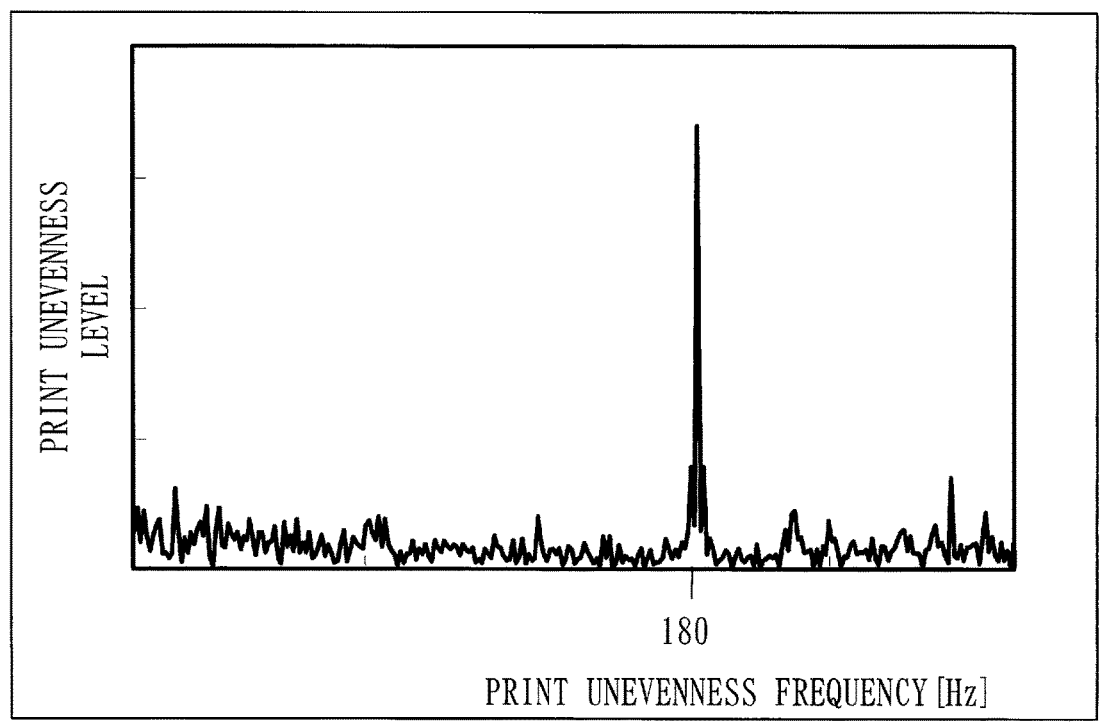
FIG. 11 is a graph illustrating a print unevenness level corresponding to excitation-phase one cycle of a stepping motor.

In step ST120, the modulation pulse count setting unit 111 Fourier-analyzes the inputted density data using a processing device, obtains the relation between the frequency and the amplitude spectrum as illustrated in FIG. 11, and calculates a print unevenness level (also called a print unevenness frequency) in a frequency corresponding to excitation-phase one cycle.

In step ST130, the modulation pulse count setting unit 111 determines whether or not the print unevenness level obtained in step ST120 exceeds the predetermined default value of the print unevenness level.

If the print unevenness level is equal to or lower than the default value (Yes in ST130), this signifies that the stepping motor 100 is an individual with speed fluctuations equal to or lower than the default value. Hence, the modulation pulse count setting unit 111 determines that the current maximum modulation pulse count p is suitable and ends the process. In the event that the maximum modulation pulse count p indicates the initial value 0, it signifies that the drive pulse frequency need not be modulated in the print mode.

If the print unevenness level exceeds the default value (No in ST130), the modulation pulse count setting unit 111 sets an arbitrary value to the maximum modulation pulse count p (step ST140). Desirably, the modulation pulse count (arbitrary value) to be set is approximately 0.4% to 2% of the set drive pulse frequency N, although it depends on the characteristics of the stepping motor and the value of the set drive pulse count N. In this case, the limit value of the maximum modulation pulse count p is approximately 2% of the set drive pulse frequency N.

In step ST150, the modulation pulse count setting unit 111 determines whether or not the maximum modulation pulse count p exceeds the limit value (threshold value).

If the maximum modulation pulse count p exceeds the limit value (Yes in ST150), it signifies that the speed fluctuations of this motor individual are too large to decrease. Thus, the modulation pulse count setting unit 111 outputs a motor exchange notice notifying exchange to another motor to a display device or the like (ST170). The modulation pulse count setting unit 111 is an example of a motor exchange notification unit.

When the motor exchange notice is outputted to the display device of the printer 10, the user exchanges the motor for another motor. After that, getting back to ST110, the user enters the density data of the next test print pattern. More specifically, the modulation pulse count setting unit 111 takes as input the density data of the test print pattern of the case that uses another motor, and executes the stage of setting the maximum modulation pulse count p again.

If the maximum modulation pulse count p is equal to or lower than the limit value (No in ST150), then in the print mode, a drive pulse modulating unit 112 carries out pulse modulation in the drive pulse frequency setting stage illustrated in FIG. 5 (step ST160). Getting back to ST110, the user enters the density data of the next test print pattern. More specifically, the modulation pulse count setting unit 111 takes as input the density data of the test print pattern of the case that uses the maximum modulation pulse count p set in step ST140, and executes the stage of setting the maximum modulation pulse count p again.

In the maximum modulation pulse count setting stage, the stages of steps ST110 to ST170 are repeated until the print unevenness level becomes equal to or falls under the default value. Alternatively, the steps of ST110 to ST170 may be repeated until the maximum modulation pulse count exceeds the limit value. The modulation pulse count setting unit 111 treats the value of a case where the print unevenness level becomes equal to or falls under the default value, as the maximum modulation pulse count p. When the maximum modulation pulse count p exceeds the limit value, it is determined that speed fluctuations of this motor individual are too large to decrease.

The motor is exchanged for another motor (step ST170), and stages of the print density data input stage (step ST110) and downward are repeated.

In the maximum modulation pulse count setting stage described above, the modulation pulse count setting unit executes the process automatically since input of the print density data until the pulse modulation stage (ST160) or a motor exchange instruction output stage (ST170). Alternatively, for example, the user (or maintenance operator) of the printer 10 may carry out the stages of test print to a print unevenness level determination stage (stages of step ST110 to step ST130) illustrated in FIG. 9, and may change the maximum modulation pulse count p as needed, using an operation panel (not shown) provided to the printer 10, or an external input device.

In the event that the printer 10 has a plurality of print speed modes, the modulation pulse count setting unit 111 sets the maximum modulation pulse count p depending on the set drive pulse frequency of each print speed mode. The drive pulse modulating unit 112 may perform the modulating operation using the maximum modulation pulse count p that matches the print speed mode and that is sent from a control unit 140.

Alternatively, the maximum modulation pulse count setting stage illustrated in FIG. 9 may be executed when the printer 10 completes printing a predetermined count of sheets. For example, when the printer 10 completes printing a predetermined count of sheets, the user (or maintenance operator) of the printer 10 may carry out the stages of test print to the print unevenness level determination stage (stages of step ST110 to step ST130) illustrated in FIG. 9, and may change the maximum modulation pulse count p as needed, using the operation panel (not shown) provided to the printer 10, or the external input device. Consequently, even when the speed fluctuations within excitation-phase one cycle of the motor become worse due to degradation over time, the optimum modulation pulse count can be set.

Figure 10:
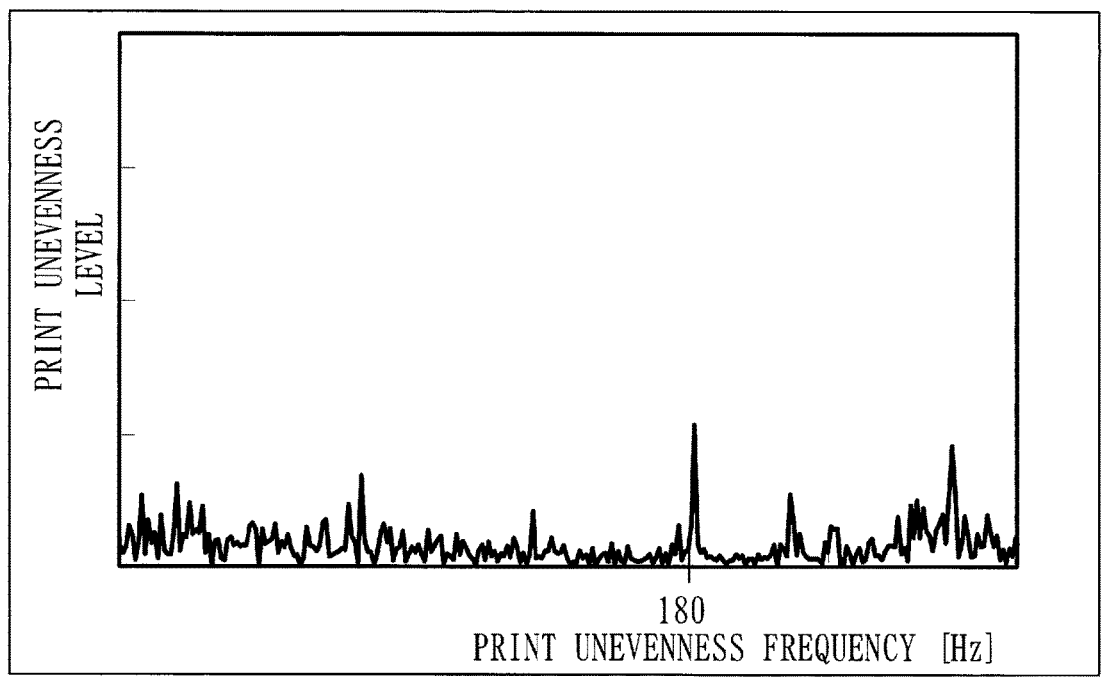
FIG. 10 is a graph illustrating a print unevenness level covering excitation-phase one cycle of a stepping motor of a printer control device according to Embodiment 1.

FIG. 10 is a graph illustrating a print unevenness level covering excitation-phase one cycle of the stepping motor 100 of a printer control device 100 according to this embodiment.

FIG. 10 illustrates the result obtained by scanning a print result with a scanner to measure the print unevenness level when an image is printed with the printer 10 (sublimation-type thermal transfer printer) whose maximum modulation pulse count p has been set to an optimal value in the maximum modulation count setting stage illustrated in FIG. 9, by driving a two-phase stepping motor by 1-2 phase excitation at 1440 Hz. Comparison of FIG. 10 with FIG. 11 indicates that the print unevenness level at 180 Hz is decreased. In this manner, when the drive pulse frequency of the stepping motor 100 is modulated, the print unevenness level after drive pulse modulation can be decreased as compared with the print unevenness level before drive pulse modulation illustrated in FIG. 11.

With the thermal transfer printer 1 according to this embodiment, the modulation pulse count p can be set separately for each stepping motor individual. Therefore, even when the speed fluctuations within excitation-phase one cycle differ between stepping motor individuals due to manufacturing variation of the stepping motors, an appropriate modulation pulse count can be set. As a result, print unevenness corresponding to the frequency of the excitation-phase one cycle of the stepping motor can be decreased.

In the above description of Embodiments 1 and 2, the "modulation pulse count setting unit", the "drive pulse modulating unit", the "motor excitation phase detecting unit", and the "drive pulse output unit" are independent function blocks that make up the printer control device 190. However, the configuration of the printer control device 190 is not limited to this. For example, the "modulation pulse count setting unit" and the "drive pulse modulating unit" may be implemented by a single function block, and the "motor excitation phase detecting unit" and the "drive pulse output unit" may be implemented by a single function block. Alternatively, the printer control device 190 may be made up of any other combinations of these function blocks.

It should be noted that the above embodiments are essentially preferable exemplifications and are not intended to limit the present invention, a product to which the present invention has been applied, or the scope of usage of the present invention, and that various changes may be made to the above embodiments as needed.

The embodiments of the present invention have been described. Two of these embodiments may be combined and practiced. One of these embodiments may be practiced partly. Two or more of these embodiments may be combined partly. The present invention is not limited to these embodiments, and various changes may be made to the invention as needed.

REFERENCE SIGNS LIST

10: printer; 20: recording paper; 30: ink sheet; 41: ink sheet feed reel; 42: ink sheet takeup reel; 50: thermal head; 60: platen roller; 71: grip roller; 72: pinch roller; 80: recording paper cutting unit; 90: delivery roller; 100: stepping motor; 101: rotor; 102: stator; 110: drive frequency setting unit; 111: modulation pulse count setting unit; 111a: maximum modulation pulse count storage unit; 112: drive pulse modulating unit; 113: motor excitation phase detecting unit; 114: drive pulse output unit; 120: memory; 130: data processing unit; 140: control unit; 150: thermal head driving unit; 160: recording paper cutting mechanism driving unit; 170: ink sheet convey driving unit; 180: stepping motor driving unit; 190: printer control device; 901: computation device; 902: external storage device; 903: main storage device; 904: communication device; 905; input/output device

The invention claimed is:

1. A motor control device to control a stepping motor that performs driving by taking as input a drive pulse having a constant frequency, the motor control device comprising:
   a drive pulse modulator to modulate a frequency of a drive pulse to be inputted to the stepping motor,
   the drive pulse modulator modulating the frequency of the drive pulse having the constant frequency such that the frequency of the drive pulse within excitation-phase one cycle of the stepping motor is: lower than the constant frequency for a period that is, by ⅛ cycle of the excitation-phase one cycle, before an excitation phase where vibration of the stepping motor is the maximum; and higher than the constant frequency in an excitation phase that is by ½ cycle subsequent to the excitation phase where the drive pulse frequency is lower than the constant frequency.

2. The motor control device according to claim 1,
   wherein the drive pulse modulator performs modulation such that the frequency of the drive pulse within the excitation-phase one cycle of the stepping motor takes: a minimum value of the excitation-phase one cycle, for a period that is, by ⅛ cycle of the excitation-phase one cycle, before the excitation phase where the vibration of the stepping motor is the maximum; and a maximum value of the excitation-phase one cycle, in an excitation phase that is by ½ cycle subsequent to the excitation phase where the vibration of the stepping motor is the maximum.

3. The motor control device according to claim 2,
   wherein the drive pulse modulator performs modulation such that an average value of the maximum value and the minimum value is the same the constant frequency.

4. The motor control device according to claim 1,
   wherein the drive pulse modulator performs modulation such that a change in frequency of the drive pulse within the excitation-phase one cycle of after modulation forms a sine wave.

5. A printer device that prints on recording paper, the printer device comprising: the motor control device according to claim 1; and a stepping motor controlled by the motor control device, as a convey driving source for the recording paper.

6. The printer device according to claim 5,
   wherein the drive pulse modulator modulates the constant frequency only in a print operation of printing on the recording paper.

7. The printer device according to claim 5,
   wherein the motor control device comprises a modulation count setter which sets a maximum modulation count of the frequency of the drive pulse based on a print unevenness level, covering the excitation-phase one cycle of the stepping motor, of a print result obtained by printing on the recording paper.

8. The printer device according to claim 7,
   wherein the modulation count setter outputs a motor exchange notice notifying exchange of the stepping motor when the maximum modulation count exceeds a threshold value.

* * * * *